INVENTOR.
EDWIN P. ARTHUR

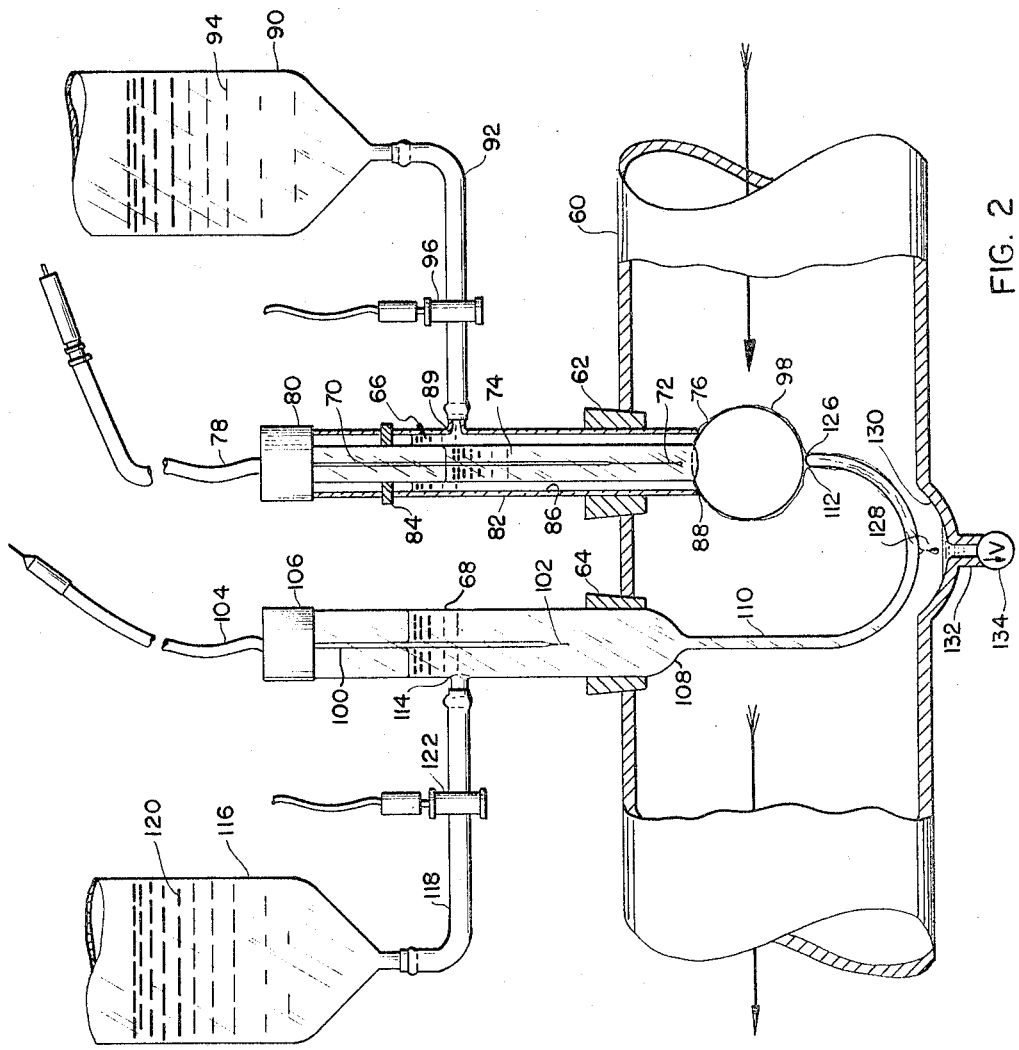

United States Patent Office 3,296,098
Patented Jan. 3, 1967

3,296,098
METHOD AND APPARATUS FOR GAS ANALYSIS
Edwin P. Arthur, Fullerton, Calif., assignor to Beckman Instruments, Inc., a corporation of California
Filed Jan. 15, 1962, Ser. No. 166,230
9 Claims. (Cl. 204—1)

The present invention relates to a method and apparatus for detecting constituents in a gas and more particularly relates to a method and apparatus for detecting minute quantities of constituents present in a gaseous medium.

The importance of identifying the presence of various compounds in gaseous mediums has long been recognized in many fields of industry and science. The efficiency of many manufacturing processes is indicated by the vapors present in the surrounding atmosphere or in the exhaust gases from the processes themselves. In addition, there is always the consideration of the protection of industrial workers from noxious vapors that may become hazardous if of sufficient strength in a given area. The same consideration is present, to a less serious degree, in the determination of vapors present in the atmosphere that may harm or annoy the general public.

The method most generally used in the past for determining the presence of vapors in a gaseous medium was the collection of liquefaction of a large volume of the gaseous medium and the subsequent fractional distillation of the resultant liquid. If the gaseous medium was atmospheric air, for example, the fractional distillation would result in the boiling off of nitrogen and oxygen, leaving a tar containing the impurities in the air, including the various vapors present therein. The tar could then be analyzed by conventional physical and chemical processes to determine the various substances that formed its composition. It is obvious that this process has serious limitations and disadvantages, the most serious being the cost and complexity of the apparatus necessary for making the analysis, and the time consumed in carrying it out. In addition, this process is useful only for periodic sampling and is completely without merit when a continuous monitoring of the gaseous medium is necessary.

According to the present invention it has now been found that a method and apparatus may be provided for continuously determining the presence of selected gases and vapors in a gaseous medium. The present invention envisions the formation of a thin film of a suitable electrolyte on an ionsensitive surface and the exposure of the thin film to the gaseous medium containing the gases and vapors to be detected. The apparatus used to perform this determination is extremely sensitive, simple in construction, requires little or no servicing and does not require the use of skilled personnel for making the analyses as was heretofore necessary.

It is therefore a primary object of the present invention to provide a method and apparatus for determining the composition and magnitude of gases and vapors present in a gaseous medium.

It is another object of the present invention to provide apparatus for the formation of a thin, vapor-absorbing film on an ion-sensitive surface.

It is another object of the present invention to provide a method for determining the presence of vapors in a gas, said method including the absorption of the vapors in a thin liquid film and the sensing of the resultant characteristics of the film.

These and further objects and advantages of the invention will become more apparent upon reference to the following specification and claims and appended drawings wherein:

FIG. 2 is a perspective view, partly in section, of another embodiment of the present invention.

Figure 1:
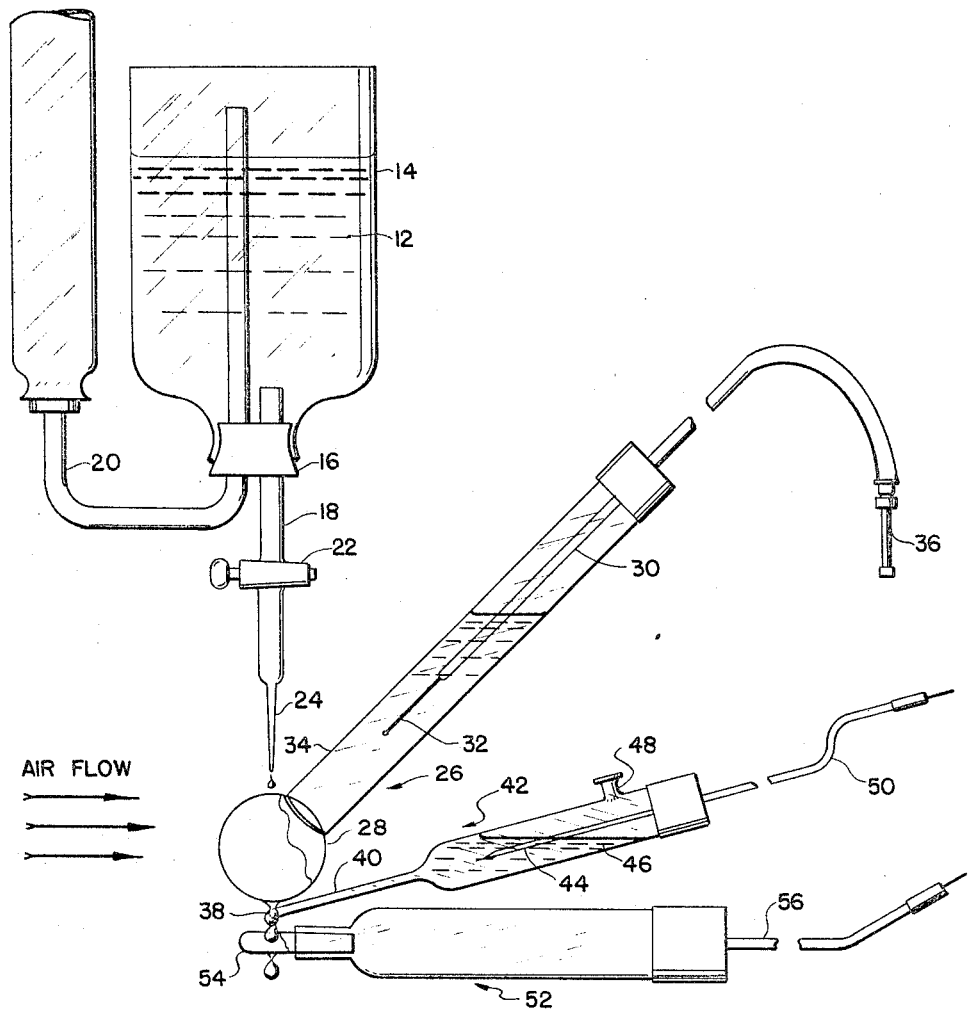
FIG. 1 is a perspective view of one embodiment of the present invention.

Referring now to FIG. 1, apparatus is shown for determining the presence of gases or vapors present in a flowing stream of air. A container 12, filled with a suitable solution, such as pure water saturated with carbon dioxide is provided with a stopper 16 through which extends a fluid conduit 18. A second conduit 20 also extends through the stopper 16 and couples the upper portion of the container with the atmosphere so that the solution may flow freely through the conduit 18. A suitable stopcock or the like 22 is provided in the conduit 18 and regulates the flow of the solution through a narrowed extension 24 of the conduit 18. Preferably, the stop-cock 22 will be adjusted so that the solution leaves the extension 24 in a dropwise manner.

Located adjacent the container 12 is a transducer generally indicated at 26. The transducer 26 is provided with a bulb 28 of a suitable pH sensitive glass. The transducer 26, in this instance, is a standard pH sensitive glass electrode and is provided with an internal half-cell 30 from which protrudes a platinum wire 32 as is well known to those skilled in the art. The transducer 26 is filled with a suitable electrolyte 34, for example acid citrate buffer, to a height above the platinum wire 32. The platinum wire 32 is coupled to a conductor 36 by means of which the transducer may be connected into a suitable sensing circuit.

The solution 14 leaving the extension 24 falls onto the glass bulb 28 and forms a thin film of solution over nearly the entire surface area thereof. The continual dropwire addition of solution to the thin film on the bulb causes a thin stream 38 of liquid to drop from the under surface of the glass bulb 28.

The liquid junction 40 of a reference half-cell generally indicated at 42 is positioned in the stream 38 of liquid leaving the bulb, thus completing a circuit between the pH sensitive transducer 26 and the reference half-cell 42. The reference half-cell 42 is provided with an internal electrode 44 and is filled with an electrolyte 46 through an opening 48 as is well known to those familiar with the art. The internal electrode 44 is coupled with a conductor 50 which may be used to connect the electrode in a suitable amplifier sensing circuit which measures the potential developed at the bulb 26 as a function of the changed electrolytic characteristics of the electrolyte film on the bulb.

In the event that more than one signal from a mixed gas or vapor is desired, a second transducer 52 may be provided. This second transducer 52 is positioned below the reference half-cell 42 and has its sensing element 54 positioned in the liquid stream 38 so that a liquid junction is also formed between the reference half-cell 42 and the transducer 52. In the embodiment shown, the sensing element 54 of the transducer 52 may be a silver-silver chloride coated billet. This transducer is coupled to a conductor 56 which is connected to the reference half-cell 42 by means of a suitable sensing circuit.

In the operation of this embodiment of the invention, a flowing stream of air or other gas containing the vapors to be detected impinges on the thin film of solution that is formed on the glass bulb 28 and the vapors are absorbed therein. The absorption of the vapors changes the chemical characteristics of the thin film and these changed characteristics may be sensed by means of the various transducers provided. The particular transducers shown are most useful in determining the presence of sodium or potassium hydroxide and chlorides in the gas stream. When the hydroxides are absorbed in the thin film of solution 28, they change the pH thereof, which change is readily detected by the combination of the pH electrode 26 and reference half-cell 42. The chloride ions present in the gas are also absorbed in the thin film and as the thin film is changed into the liquid stream 38, a liquid junction is formed between the reference electrode 42 and the transducer 52 with the result that an output signal is developed from which the concentration of chloride ions may be estimated.

It should be obvious to one skilled in the art that this apparatus may easily be modified to detect other vapors. If, for example, it was desired to detect sulfur dioxide, a platinum transducer may be utilized. If it is desired to detect fluoride vapors, the glass transducer could be replaced by a platinum bulb. This would be necessary as the glass would be eaten by the resultant hydrofluoric acid. In place of the solution 14, a solution of hydroquinone would preferably be used. If desired, the pH electrode and the reference half-cell can be replaced by a single combination electrode assembly of the type well known in the art, the single requirement being that combination electrode assembly be given an area large enough to absorb a sufficient amount of the vapors present in the gas. The flow of solution from the tank 12 could also be regulated by the stop-cock 22 to form a continuous flow rather than a series of drops if this is found desirable.

Referring now to FIG. 2, there is shown an embodiment of the invention suitable for use in detecting gases or vapors present in a gas stream flowing through a duct. In this embodiment, the vapor containing gas flows through a duct 60 which is provided with a pair of stoppers or sealing members 62 and 64. The stopper 62 enables a transducer 66 similar to the pH sensitive glass electrode 26 of FIG. 1 to extend into the duct 60 while the stopper 64 enables a reference half-cell 68 similar to the reference half-cell 42 of FIG. 1 to be in communication with the interior of the duct 60.

The transducer 66 is provided with an internal half-cell 70 from which projects a silver-silver chloride electrode 72 and is filled with a suitable electrolyte 74 such as citrate buffer stabilized in chloride ion concentration. The transducer is provided at its lower end with a bulb 76 of ion-sensitive glass similar to the bulb 28 of FIG. 1. The silver-silver chloride electrode 72 is coupled to a conductor 78 through the electrode assembly cap 80. A cylinder 82, preferably made of glass or a suitable plastic is spaced around the transducer 66 and is maintained in position by being suitably attached to a flanged extension 84 of the cap 80. The cylinder 82 forms an annular chamber 86 around the transducer 66 and is adjusted relative to the bulb 76 so that a very narrow aperture is defined by the lower edge of the cylinder 82 onto the glass bulb 76.

The cylinder 82 is provided with a suitable filling hole 89 so that the annular chamber 86 is in fluid communication with a container 90 by means of a conduit 92, preferably of rubber or other elastic material. The container 90 is filled with a suitable electrolyte such as a lightly buffered solution 94 and the flow of this electrolyte to the annular chamber 86 through the conduit 92 is regulated by a suitable valve 96. This valve may be of the type having a pair of members which pinch the conduit 92 and thus regulates the flow of liquid therethrough.

The half-cell 68 is provided with an internal glass tube 100 from which protrudes a suitable silver-silver chloride reference electrode 102. This electrode 102 is coupled to a conductor 104 through the electrode cap 106. The half-cell 68 is narrowed down at 108 to form a narrow, generally U-shaped fluid conduit 110 which ends adjacent the lower side of the glass bulb 76, leaving a slight aperture 112 therebetween.

The half-cell 68 is further provided with a suitable filling hole 114 which is coupled in fluid communication with a container 116 by means of an elastic conduit 118 similar to the conduit 92. The container is filled with a suitable electrolyte 120 such as potassium chloride and the flow of this electrolyte through the conduit 118 is controlled by a valve 122 similar to the valve 96.

The electrolyte 120 flows through the conduit 118, the upper portion of the electrode 68 and the U-shaped conduit 110 and flows out of the conduit 110 through the aperture 112 formed by the end of the conduit 110 and the glass bulb 76. The electrolyte 94 from the container 90 flows through the conduit 92 and the annular chamber 86 through the aperture 88 and forms a thin film 98 of liquid on the bulb 76. The thin film 98 and the overflow from the conduit 110 mix at 126 with the result that a salt bridge is formed between the pH sensitive transducer 66 and the reference electrode 102. The rates of flow should be adjusted so that the electrolyte 120 flowing through the conduit 110 is always slightly higher than the rate of flow of the solution forming the thin film 98 so that the latter liquid is prevented from entering the conduit 110.

After the two liquids are mixed at 126, they run down the outside of the conduit 110 forming drops or a thin stream at 128. The duct 60 is provided with a recess 130 for collecting this liquid and the liquid collected in the recess 130 is vented to waste by means of a conduit 32 controlled by suitable one-way valve 134. In operation, this embodiment is similar to the embodiment of FIG. 1. The vapors present in the gas flowing through the duct 60 impinge on the thin film 98 and the vapors are absorbed therein with the result that the pH thereof is changed. This change is sensed by a suitable electrical circuit coupled to the conductors 78 and 104. As was the case with the embodiment of FIG. 1, various other electrodes may be substituted for the electrodes illustrated for sensing other vapors, as will be apparent to those skilled in the art.

From the above description, it will be obvious that the present invention provides a simple and inexpensive apparatus and method for determining the composition and magnitude of vapors present in a gaseous medium. By use of this method and apparatus, these vapors can continually be monitored by one with no technical skill, as it is only necessary to read a commonplace electrical meter or recorder rather than conduct involved analyses as was heretofore necessary.

The invention may be embodied in other specific forms not departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:
1. A method for determining the presence of selected constituents in a gas comprising:
   continuously flowing electrolyte as a thin film over an uncovered ion sensitive bulb of a sensing electrode so that a continuously renewed thin film of electrolyte is provided over said bulb;
   exposing the electrolyte film on said bulb directly to the gas whereby the constituents present in the gas are absorbed by said film; and
   electrolytically sensing the potential developed at said ion sensitive bulb as an indication of the changed electrolytic characteristics of said film caused by the absorbed constituents.

2. The method of claim 1 wherein said thin film is formed by continuously delivering said electrolyte to said bulb in a dropwise fashion.

3. The method of claim 1 wherein said electrolytic sensing is performed by positioning a reference half-cell closely adjacent to said bulb so that said electrolyte forms a liquid path between the sensing electrode and said reference half-cell.

4. A method for determining the presence of selected vapors in a gas, comprising:
  continuously flowing electrolyte as a thin film over an uncovered ion sensitive bulb of a glass electrode so that a continuously renewed thin film of electrolyte is provided over said bulb;
  exposing the electrolyte film on said bulb directly to the gas whereby the vapors present in the gas are absorbed by said film;
  positioning a reference half-cell closely adjacent to said bulb;
  forming a liquid path of said electrolyte between said bulb and said reference half-cell by controlling the formation of said film; and
  electrolytically sensing the potential developed between said glass electrode and said reference half-cell as an indication of the altered electrolytic characteristics of said electrolyte caused by the absorption of said vapors therein.

5. An apparatus for detecting the presence of a vapor in a gas, the combination comprising:
  a sensing electrode having an uncovered ion sensitive bulb as a portion thereof;
  means for forming a continuously renewed thin film of electrolyte over said bulb;
  said film forming means including an electrolyte reservoir having an outlet adjacent to the upper portion of said bulb and flow control means operatively associated with said reservoir for controlling the flow of electrolyte from said outlet to form said film;
  a reference half-cell including a liquid junction end, said end being positioned closely adjacent to said bulb so as to contact said film of electrolyte on said bulb;
  said film forming means constituting the sole means for providing electrolytic connection between said sensing electrode and said reference half-cell whereby said film of electrolyte on said bulb is adapted to be exposed directly to the gas and said vapor is absorbed only by said film on said bulb; and
  said sensing electrode and reference half-cell having means for electrical connection to a potential measuring device for measuring the potential developed at said ion sensitive bulb as an indication of the changed electrolytic characteristics of said film caused by the absorbed vapor.

6. An apparatus as set forth in claim 5 wherein said reference half-cell is positioned below said bulb so as to receive a continuous path of electrolyte leaving said bulb.

7. An apparatus as set forth in claim 5 wherein said bulb is formed of ion sensitive glass.

8. An apparatus as set forth in claim 5 wherein said ion sensitive bulb is formed of platinum.

9. In apparatus for detecting the presence of a vapor in a gas, the combination comprising:
  a sensing electrode having a main body portion and an uncovered ion sensitive bulb at one end thereof;
  a first electrolyte reservoir;
  means connected to said reservoir and surrounding said main body portion of said sensing electrode providing an annular chamber thereabout for holding electrolyte;
  said means having its lower end adjacent to the upper portion of said bulb and spaced slightly therefrom to provide a narrow aperture through which electrolyte may pass to form a thin film of electrolyte on said bulb;
  a reference half-cell including a container for a second electrolyte, an internal half-cell in said container and a liquid junction forming means;
  a second electrolyte reservoir, conduit means connecting said second electrolyte reservoir to the interior of said reference half-cell;
  said liquid junction forming means comprising a conduit having one end connected to the interior of said container of said reference half-cell and having its other end disposed closely adjacent to the lower portion of said bulb so as to contact electrolyte leaving said bulb; and
  means associated with said first and second electrolyte reservoirs for controlling the flow of electrolyte from said reservoirs whereby a greater flow of electrolyte may be delivered from said second reservoir through said reference half-cell to said conduit than from said first electrolyte reservoir through said chamber to said bulb.

References Cited by the Examiner

UNITED STATES PATENTS

| 2,108,294 | 2/1938 | Doyle et al. | 204—195 |
| 2,499,852 | 3/1950 | Dietz | 204—195 |
| 2,651,612 | 9/1953 | Haller | 204—195 |
| 3,028,317 | 4/1962 | Wilson et al. | 204—1 |
| 3,070,539 | 12/1962 | Arthur et al. | 204—195 |

FOREIGN PATENTS 643,624  4/1937  Germany.

OTHER REFERENCES

Mattock, "pH Measurement and Titration," 1961, page 247.

Beckman Instruction Bulletin No. 1134, August 1960.

JOHN H. MACK, *Primary Examiner.*

JOHN R. SPECK, MURRAY TILLMAN, *Examiners.*

WINSTON A. DOUGLAS, T. TUNG,
*Assistant Examiners.*